(12) United States Patent
Chen et al.

(10) Patent No.: US 7,477,489 B1
(45) Date of Patent: Jan. 13, 2009

(54) ACTUATOR INCLUDING AN ACTUATOR ARM WITH A FIRST MICROACTUATOR SUPPORTING A READ HEAD AND A FORCE-BALANCING MICROACTUATOR WITHOUT ANY READ HEAD

(75) Inventors: Yih-Jen Chen, Fremont, CA (US); Gwo-Jeng Lo, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 547 days.

(21) Appl. No.: 11/350,427

(22) Filed: Feb. 9, 2006

(51) Int. Cl.
*G11B 21/24* (2006.01)
(52) U.S. Cl. .................................................. 360/294.4
(58) Field of Classification Search ................. 360/294, 360/294.1, 294.2, 294.3, 294.4, 294.5, 294.6, 360/294.7
See application file for complete search history.

(56) References Cited

U.S. PATENT DOCUMENTS

| 5,764,444 A | * | 6/1998 | Imamura et al. ......... 360/294.4 |
| 2002/0003681 A1 | * | 1/2002 | Takegawa ................... 360/244 |

* cited by examiner

*Primary Examiner*—Craig A Renner (57) ABSTRACT

An actuator assembly for use in a disk drive includes a first read head and a coarse actuator. The coarse actuator includes a coarse actuator body and a first actuator arm extending away from the coarse actuator body. The first actuator arm has a proximal end attached to the coarse actuator body and a distal end. The actuator assembly further includes a first microactuator attached to the distal end of the first actuator arm. The first microactuator supports the first read head. The actuator assembly further includes a first force-balancing microactuator attached to the distal end of the first actuator arm without any read head attached to the first force-balancing microactuator.

10 Claims, 7 Drawing Sheets

ACTUATOR INCLUDING AN ACTUATOR ARM WITH A FIRST MICROACTUATOR SUPPORTING A READ HEAD AND A FORCE-BALANCING MICROACTUATOR WITHOUT ANY READ HEAD

FIELD OF THE INVENTION

The present invention relates generally to disk drives, and in particular to a disk drive actuator including an actuator arm with a first microactuator that supports a read head and a force-balancing microactuator without any read head.

BACKGROUND

The typical hard disk drive includes a head disk assembly (HDA) and a printed circuit board assembly (PCBA) attached to a disk drive base of the HDA. The head disk assembly includes at least one disk (such as a magnetic disk), a spindle motor for rotating the disk, and a head stack assembly (HSA). The printed circuit board assembly includes a servo control system in the form of a disk controller for generating servo control signals. The head stack assembly includes at least one head, typically several, for reading and writing data from and to the disk. The head stack assembly is controllably positioned in response to the generated servo control signals from the disk controller. In so doing, the attached heads are moved relative to tracks disposed upon the disk.

The head stack assembly includes an actuator assembly, and at least one head gimbal assembly with a flexure. A conventional "rotary" or "swing-type" actuator assembly typically includes a rotary actuator having an actuator body. The actuator body has a pivot bearing cartridge to facilitate rotational movement of the actuator assembly. An actuator coil is supported by the actuator body and is configured to interact with one or more magnets, typically a pair, to form a voice coil motor. One or more actuator arms extend from an opposite side of the actuator body.

The spindle motor typically includes a rotatable spindle motor hub, a magnet attached to the spindle motor hub, and a stator. The stator typically includes a series of coils that are in electrical communication with the printed circuit board assembly. With this general configuration, the various coils of the stator are selectively energized to form an electromagnetic field that pulls/pushes on the magnet, thereby imparting a rotational motion onto the spindle motor hub. Rotation of the spindle motor hub results in the rotation of the attached disks.

During operation of the disk drive, the heads must be controllably positioned in relation to tracks of the disks. The pivoting motion of the rotary actuator provides a basic mode of actuation of positioning the heads. Prior art attempts have been directed towards providing a secondary actuation of the heads, for example to increase bandwidth or track-following resolution. Such a configuration has been referred to a dual-stage actuation or microactuation. It is contemplated actuation of microactuators may result in vibrational excitation of the associated actuator arms. This is due to the reaction force between the microactuator and a distal end of the associated actuator arm. Such vibrational excitation may give rise to an undesirable change in the resonance response of the head stack assembly. This can result in a narrowing of the servo bandwidth to act to deteriorate the function of the secondary actuation of the microactuators. Therefore, it is contemplated that there is a need in the art for an improved microactuator configuration.

SUMMARY

According to an aspect of the present invention, there is provided an actuator assembly for use in a disk drive. The actuator assembly includes a first read head and a coarse actuator. The coarse actuator includes a coarse actuator body and a first actuator arm extending away from the coarse actuator body. The first actuator arm has a proximal end attached to the coarse actuator body and a distal end. The actuator assembly further includes a first includes a first microactuator attached to the distal end of the first actuator arm. The first microactuator supports the first read head. The actuator assembly further includes a first force-balancing microactuator attached to the distal end of the first actuator arm without any read head attached to the first force-balancing microactuator.

According to various embodiments, the actuator assembly may further include a first balancing element supported by the first force-balancing microactuator. The actuator assembly may further include a first head gimbal assembly that includes the first read head, the first head gimbal assembly having a first mass, the first balancing element having a mass between eighty percent and one hundred and twenty percent of the first mass.

In another embodiment, the actuator assembly may further include a second actuator arm, a second read head, and a second microactuator distally attached to the second actuator arm, the second microactuator supporting the second read head. The actuator assembly may further include a third read head, and a third microactuator distally attached to the second actuator arm, the third microactuator supporting the third read head. The actuator assembly may further include a third actuator arm, a fourth read head, and a fourth microactuator distally attached to the third actuator arm. The second actuator arm is disposed between the first actuator arm and the third actuator arm, and the fourth microactuator supports the fourth read head. The actuator assembly may further include a second force-balancing microactuator distally attached to the third actuator arm without any read head attached to the second force-balancing microactuator.

Further, the actuator assembly may further include a first balancing element supported by the first force-balancing microactuator. The actuator assembly may further include a first head gimbal assembly that includes the first read head, the first head gimbal assembly having a first mass, the first balancing element having a mass within about twenty percent of the first mass. The actuator assembly may further include a second balancing element supported by the second force-balancing microactuator. The actuator assembly may further include a second head gimbal assembly that includes the second read head, the second head gimbal assembly having a second mass. The second balancing element has a mass within about twenty percent of the second mass.

In addition, the first force-balancing microactuator may be configured to actuate in a direction opposite of the first microactuator during operation of the first microactuator.

DESCRIPTION OF THE PREFERRED EMBODIMENTS

Figure 1:
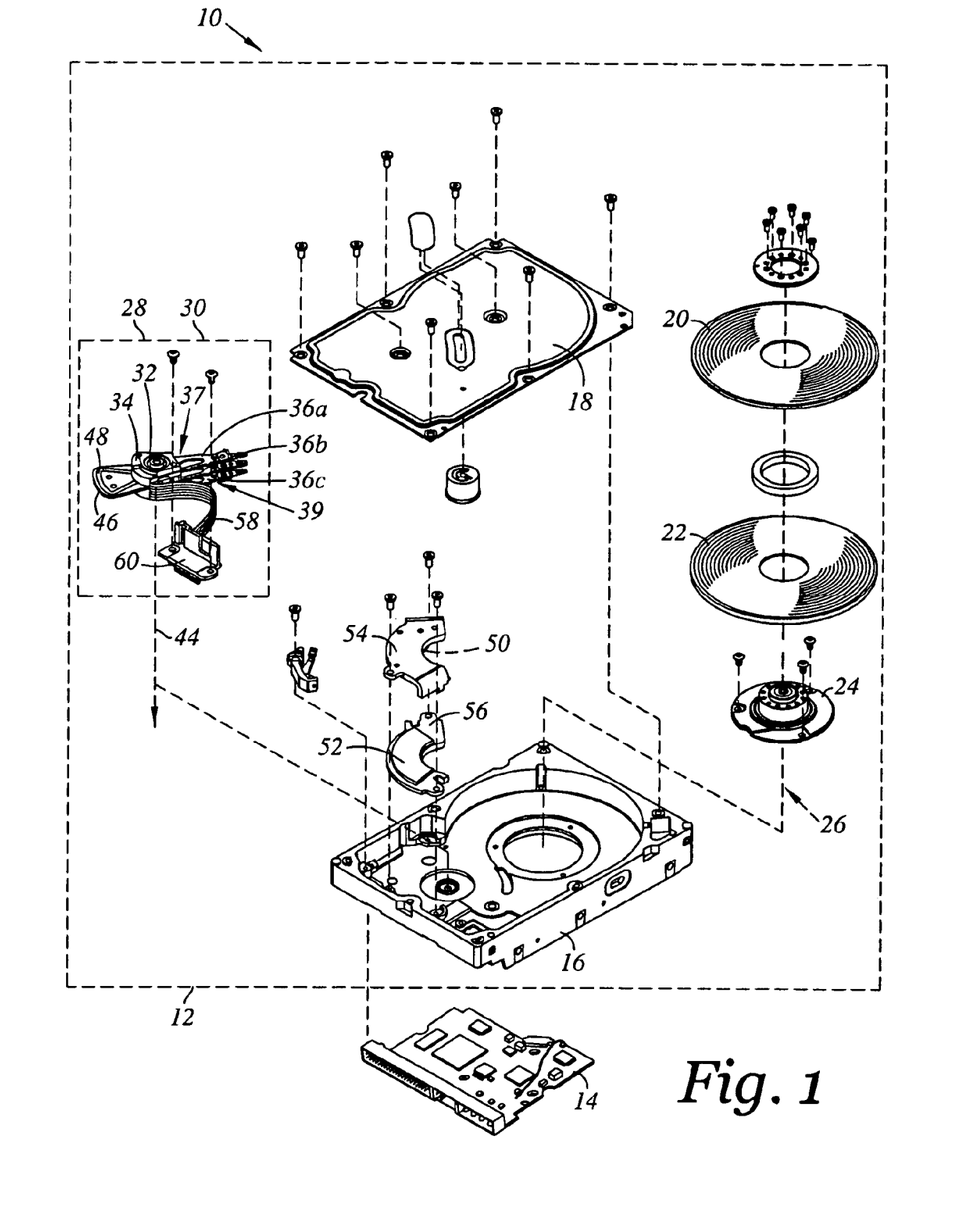
FIG. 1 is an exploded top perspective view of a disk drive compatible with an actuator assembly of an exemplary embodiment of the present invention.

Referring now to FIG. 1, there is depicted an exploded perspective view of a disk drive 10 capable of incorporating an embodiment of the present invention (details of which are discussed below and shown in additional figures). The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house disks 20, 22. A single disk or additional disks may be utilized. The disks 20, 22 each include a disk inner diameter, and a plurality of tracks for storing data. The disks 20, 22 may be of a magnetic recording type of storage device, however, other arrangements such as optical recording may be utilized. The head disk assembly 12 further includes a spindle motor 24 for rotating the disks 20, 22 about a disk rotation axis 26. The head disk assembly 12 further includes an actuator assembly 28. The actuator assembly 28 includes a head stack assembly 30 rotatably attached to the disk drive base 16 in operable communication with the disks 20, 22. The head stack assembly 30 includes a rotary actuator 32. The rotary actuator 32 may be considered a coarse actuator.

Figure 2:
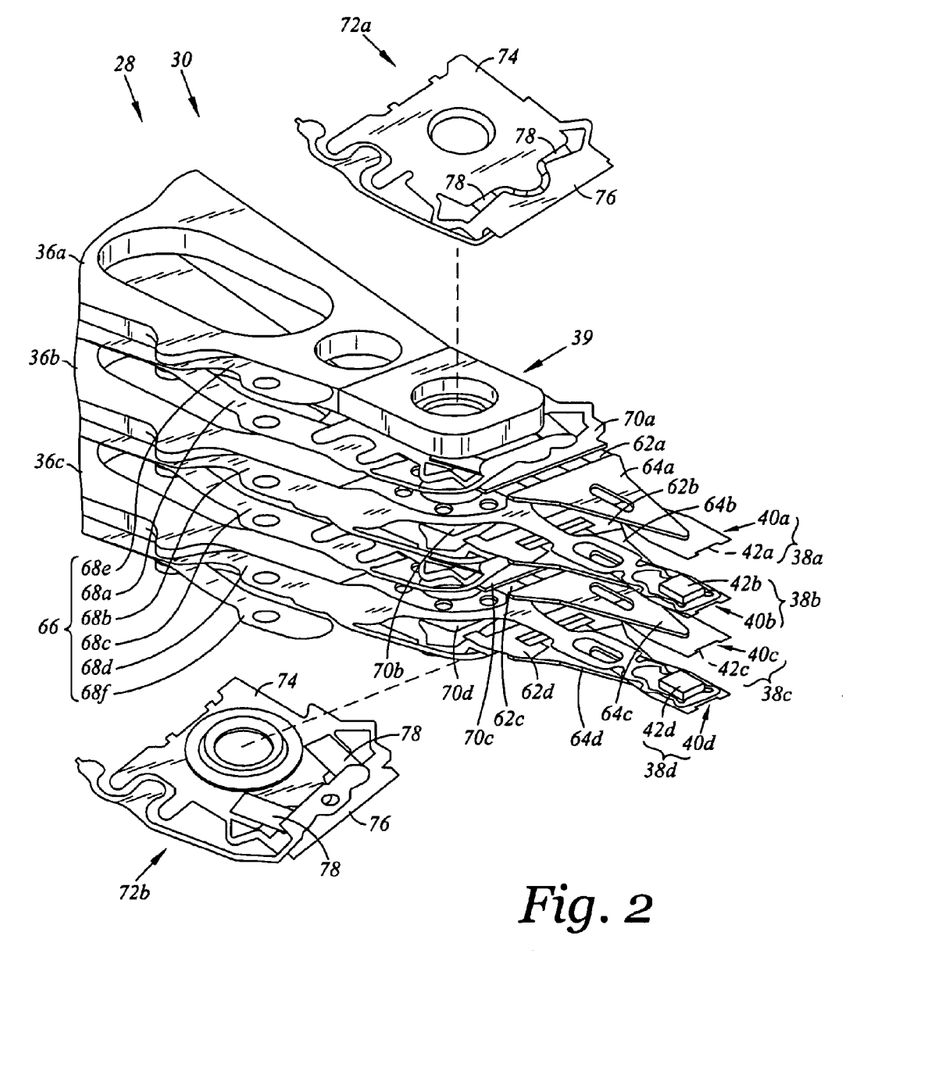
FIG. 2 is a perspective top view of a portion of an actuator assembly, with first and second force-balancing microactuators exploded away from a remaining portion of the actuator assembly, of an embodiment of the present invention.
Figure 3:
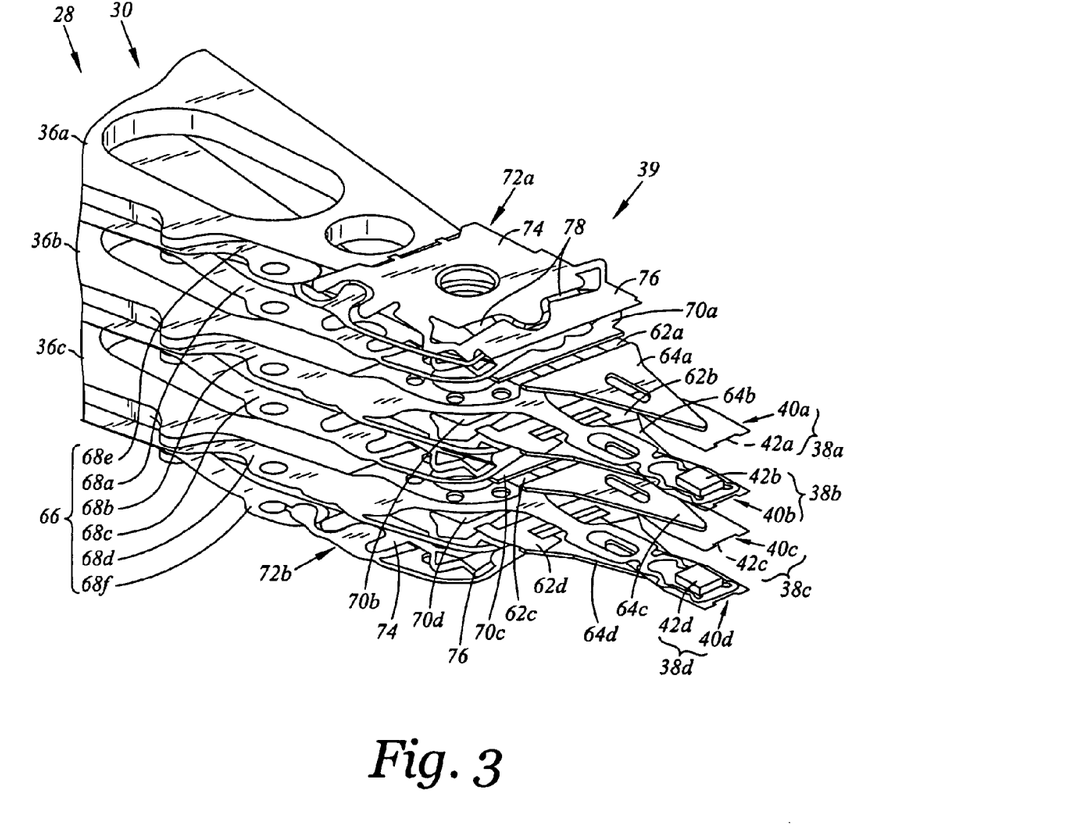
FIG. 3 is a perspective top view of the portion of the actuator assembly of FIG. 2 as assembled.
Figure 4:
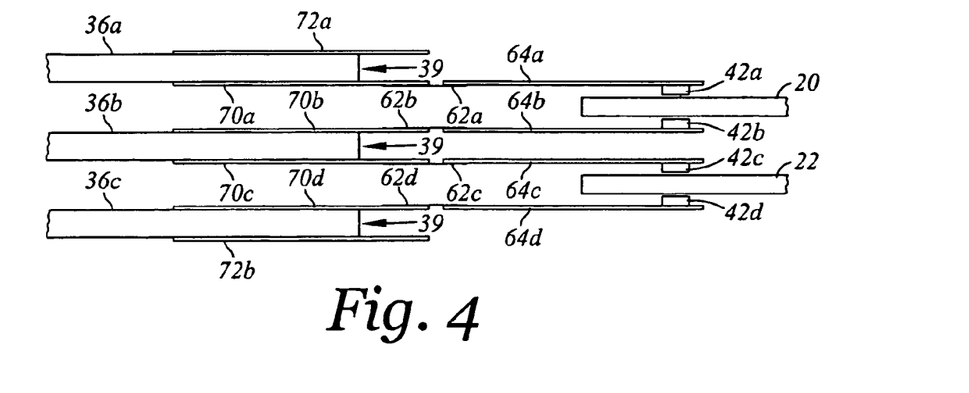
FIG. 4 is a side view of the portion of the actuator assembly of FIG. 3.

Referring additionally to FIGS. 2-4, the rotary actuator 32 includes an actuator body 34 and actuator arms 36 (individually denoted 36a-c) that extend from the actuator body 34. Each of the actuator arms 36 has a proximal end 37 attached to the actuator body 34 and a distal end 39. In FIG. 1, for ease of illustration, only the actuator arm 36a is denoted with the proximal end 37 and actuator arm 36c is denoted with the distal end 39. In the embodiment shown, head gimbal assemblies 38a-d are distally respectively attached to the actuator arms 36a-c at the distal ends 39. The head gimbal assemblies 38a-d each include suspension assemblies 40a-d that respectively support heads 42a-d. It is contemplated that the number of actuator arms and head gimbal assemblies may vary depending upon the number of disks and disk surfaces utilized.

Each head 42 typically includes a transducer for writing and reading data. At the least, each transducer includes a read element and may additionally include a writer. In this regard, each head 42 may be referred to as a read head. In magnetic recording applications, the transducer's writer may be of a longitudinal or perpendicular design, and the read element of the transducer may be inductive or magnetoresistive. In optical and magneto-optical recording applications, the head 42 may also include an objective lens and an active or passive mechanism for controlling the separation of the objective lens from a disk surface of the disks 20, 22. Each of the disks 20, 22 includes opposing disk surfaces. In magnetic recording applications the disk surface typically includes one or more magnetic layers. Data may be recorded along data annular regions on a single disk surface or both.

The actuator assembly 28 may be pivoted such that each head 42 is disposed adjacent to the various data annular regions from adjacent the outer diameter to adjacent the inner diameter of each of the disks 20, 22. In the embodiment shown, the actuator body 34 includes a bore, and the rotary actuator 32 further includes a pivot bearing cartridge engaged within the bore for facilitating the actuator body 34 to rotate between limited positions about an axis of rotation 44. The rotary actuator 32 further includes a coil support 46 that extends from one side of the actuator body 34 opposite the actuator arms 36. The coil support 46 is configured to support an actuator coil 48.

First and second magnets 50, 52 are supported by magnet supports 54, 56 which are attached to the disk drive base 16 (the first magnet 50 is denoted in dashed lining and it is understood that it is disposed at an underside of the magnet support 54). The actuator coil 48 interacts with the first and second magnets 50, 52 to form a voice coil motor for controllably rotating the actuator 32. The actuator assembly 28 further includes a flex cable assembly 58 and a cable connector 60. The cable connector 60 is attached to the disk drive base 16 and is disposed in electrical communication with the printed circuit board 14. The flex cable assembly 58 supplies current to the actuator coil 48 and carries signals between the heads 42 and the printed circuit board assembly 14.

In the embodiment shown, each of the suspension assemblies 40a-d includes a hinge plate 62 that is respectively attached to the actuator arms 36a-c. Where the hinge plate 62 is integrated with the load beam 64, the hinge plate 62 may be referred to as a bend area of the load beam 64. As shown, the load beams 64a-d are respectively attached to the hinge plates 62 with the load beams 64a-d extending distally from the hinge plates 62 and the actuator arms 36a-c. A trace assembly 66 is electrically connected to the flex cable assembly 58. The trace assembly 66 may be referred to as a flexure. The trace assembly 66 includes trace segments 68a-d. The trace segment 68a extends along the actuator arm 36a and the load beam 64a. The trace segments 68b-c extend along the actuator arm 36b and the respective load beams 64b-c. The trace segment 68d extends along the actuator arm 36d and the load beam 64d. The heads 42 are attached to and electrically connected to the trace assembly 66.

In the particular embodiment shown, there are provided microactuators 70a-d that are each respectively configured to move the heads 42a-d relative to the actuator body 34. The actuator 32 may thus be considered a dual-stage actuator. In this regard, the microactuators 70a-d may be used to move the heads 42a-d relative to a radial direction with regard to the axis of rotation 44. As such, the microactuators 70a-d may be utilized to "fine tune" controlled movement of the heads 42a-d in comparison to the coarse adjustments facilitated by the overall rotation of the rotary actuator 32 about the axis of rotation 44. To accomplish such "fine tuning" the microactuators 70a-d may have greater bandwidth, but lesser stroke, than the voice coil motor.

Figure 5:
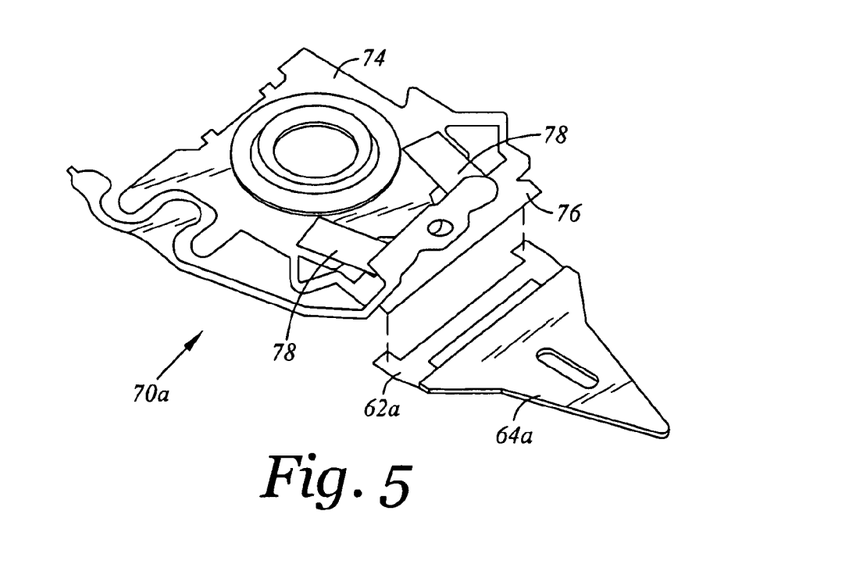
FIG. 5 is an exploded perspective top view of a microactuator, a hinge plate, and a load beam of FIG. 4.

Referring to FIG. 5, there is depicted an exploded view of the microactuator 70a, the hinge plate 62a and the load beam 64a. In this embodiment, the microactuator 70a includes a swage mounting plate 74, an actuated portion 76 and actuator elements 78. The swage mounting plate 74 may be swage attached to the distal end 39 of a respective one of the actuator arms 36a-c. The actuator elements 78 may be piezoelectric elements which longitudinally expand and contract to pivot the actuated portion 76. Such pivoting motion results in movement of the attached hinge plate 62a and the load beam 64a for moving the head 42a. The depiction of the microactuator 70a in FIG. 5 is representative of the microactuators 70b-d.

The actuator elements 78 exhibit a change in physical geometry in response to the application of a voltage potential across at least a portion of such actuator elements 78. Such change in physical geometry includes expansion or contraction in specific dimensions, as well as bending or twisting movements. The actuator elements 78 may be formed of materials which may be chosen from those which are well known to one of ordinary skill in the art. An example of a suitable material used for the actuator elements 78 is PZT (Lead Zirconate Titanate). The actuator elements 78 may be generally rectangular shaped such as shown. However, the actuator elements 78 may vary in number, and may have other shapes, including more complex geometries including those with curvatures, non-uniform thicknesses and/or a variety of layers.

The microactuators 70a-d may be electrically connected to the trace assembly 66 respectively via the trace segments 68a-d. While in the embodiment shown there are four such microactuators 70a-d, it is contemplated that fewer or more than four microactuators may be utilized. Moreover, while in the embodiment shown, the microactuators 70a-d are respectively disposed between the actuator arms 36a-c and the hinge plates 62a-d as discussed above, the microactuators 70a-d may be utilized at other locations about the rotary actuator 30. For example, it is contemplated microactuators may be positioned and used in a load beam to facilitate relative movement between different portions of such load beam. As another example, it is contemplated that microactuators may be positioned to move the heads relative to load beams.

In the embodiment shown, by selectively energizing the flex circuit segments 68a-d, the actuator elements 78 may be actuated to expand and/or contract at differing times and magnitude. This would result in movement of the attached load beams 64a-d for controlled movement of the associated heads 42a-d. Thus, a secondary or fine actuation may be achieved relative to the primary or coarse actuation as implemented by the pivoting movement of the rotary actuator 32 about the axis of rotation 44. It is understood that the microactuators 70a-d may be of other configurations and need not be piezoelectric based in nature. It is only required that the microactuators 70a-d be capable of respectively actuating movement of the heads 42a-d in addition to movement of the heads 42a-d as a result of the coarse actuation due to the pivoting of the rotary actuator 32.

As will be discussed further below, in the particular embodiment shown, there is provided force-balancing microactuators 72a-b. The trace assembly 66 may include trace segments 68e-f which are respectively electrically connected to the force-balancing microactuators 72a-b. In the embodiment shown, the force-balancing microactuators 72a-b are similarly configured as the microactuators 70a-d, in that the force-balancing microactuators 72a-b may each also include a swage mounting plate 74, an actuated portion 76 and actuator elements 78.

According to an embodiment as shown, there is provided the actuator assembly 28 for use in the disk drive 10. The actuator assembly 28 includes a first read head, such as the head 42a. The actuator assembly 28 includes a coarse actuator, such as the rotary actuator 32. The actuator 32 includes the actuator body 34 and a first actuator arm, such as actuator arm 36a, extending away from the actuator body 34. The actuator arm 36a has the proximal end 37 attached to the actuator body 34 and the distal end 39. The actuator assembly 28 further includes a first microactuator, such as microactuator 70a, attached to the distal end 39 of the actuator arm 36a. The microactuator 36a supports the head 42a. The actuator assembly 28 further includes a first force-balancing microactuator, such as the force-balancing microactuator 72a attached to the distal end 39 of the actuator arm 36a without any read head attached to the force-balancing microactuator 72a.

The actuator arms 36 may include a single or two heads. For example, the actuator arm 36b includes a head 42b which is disposed adjacent a bottom side of the disk 20 and a head 42c which is disposed adjacent a top side of the disk 22. However, for further example, the actuator arm 36a only includes a single head 42a which is disposed adjacent a top side of the disk 20. At any given time, only one of the heads 42a-d is performing reading or writing operations. During performance of such operation, for a particular head, such as head 42a, the associated microactuator 70a is being actuated.

In the case where an actuator arm 36 includes only a single head (such as the actuator arm 36a with the head 42a or the actuator arm 36c with the head 42d) the force-balancing microactuators 72a-b may be utilized to mitigate the reaction forces generated by the actuation of the microactuators 70a, 70d. In this regard, the force-balancing microactuators 72a-b may each be respectively configured to actuate in a direction opposite of the microactuators 70a, 70d during operation of the microactuators 70a, 70d, which can reduce undesirable vibrations.

Figure 6:
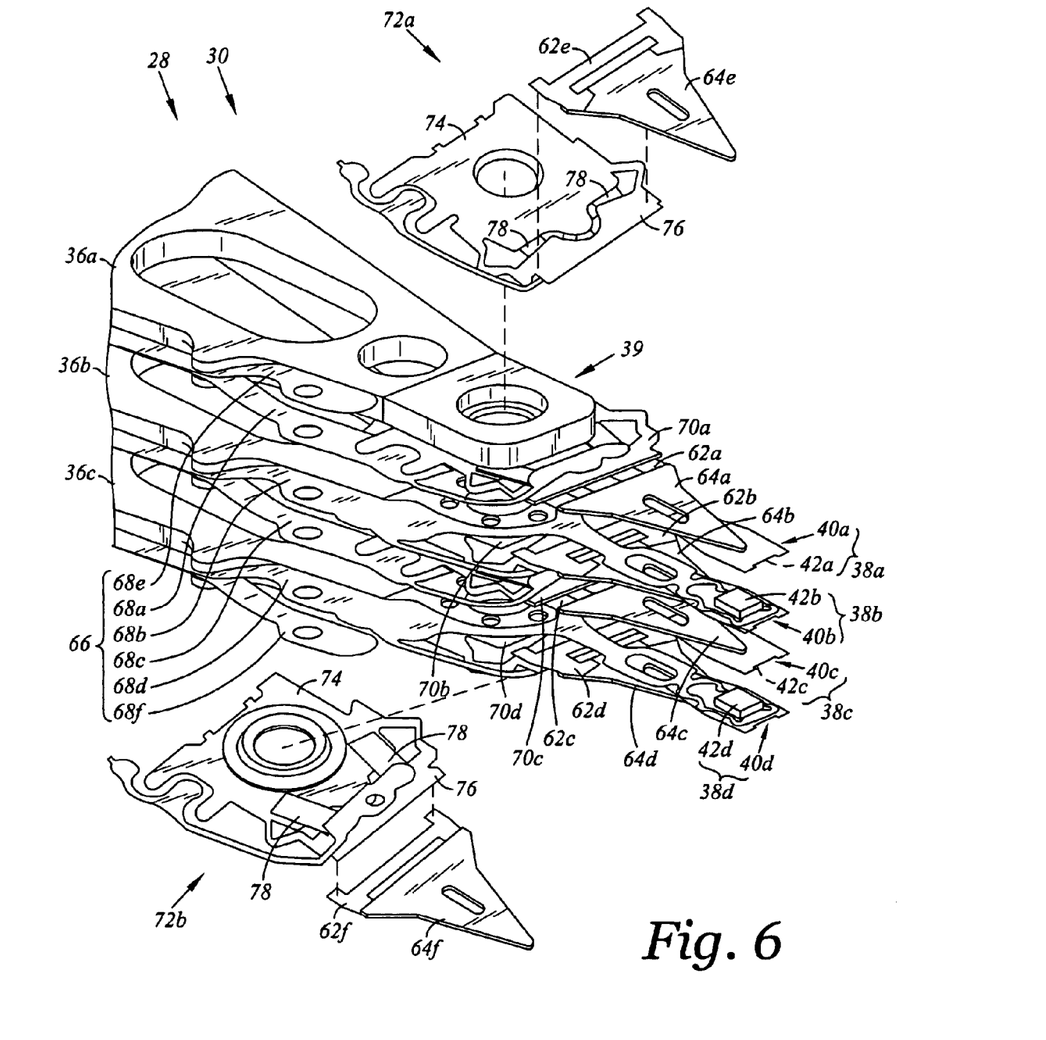
FIG. 6 is a perspective top view of a portion of an actuator assembly, with first and second force-balancing microactuators, hinge plates and load beams exploded away from a remaining portion of the actuator assembly, of an exemplary embodiment of the present invention.
Figure 7:
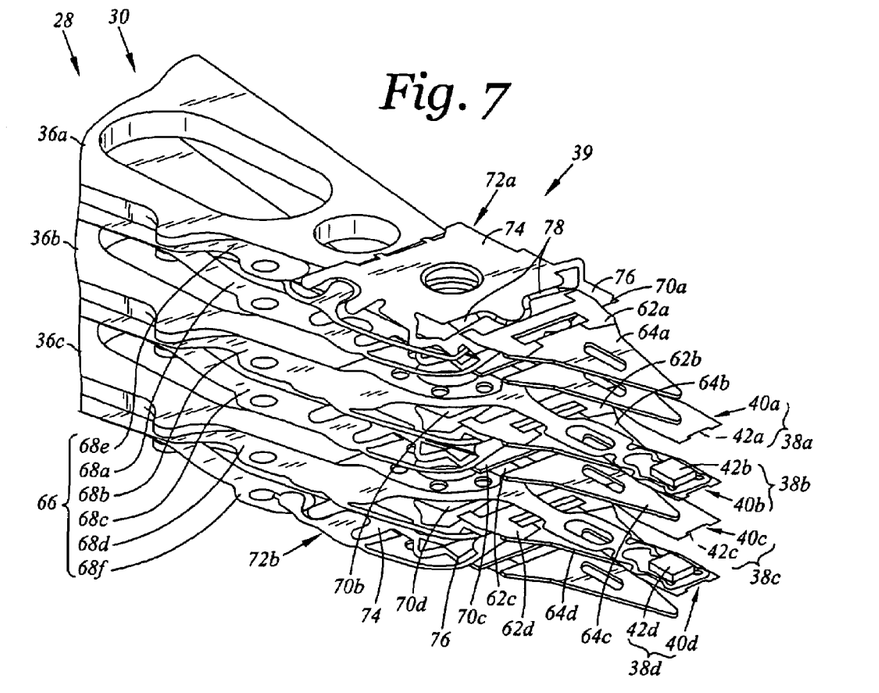
FIG. 7 is a perspective top view of the portion of the actuator assembly of FIG. 6 as assembled.
Figure 8:
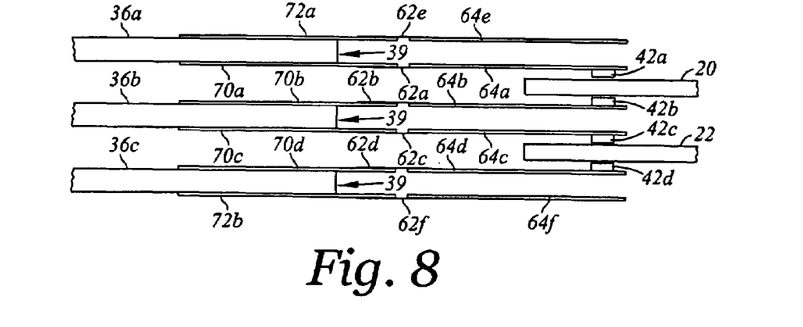
FIG. 8 is a side view of the portion of the actuator assembly of FIG. 7.

Referring now to FIGS. 6-8, there is depicted another embodiment. Similar reference numerals as those in relation to the embodiments shown in FIGS. 1-5 are used to indicate similarly configured components, however, with those differences as noted below. In this regard, the force balancing microactuators 72a-b each includes an attached balancing element. In the particular embodiment shown, such balancing element takes the form of hinge plates 62e-f and load beams 64e-f respectively attached to each of the actuated portions 76 of the force-balancing microactuators 72a-b. Inclusion of such balancing element is contemplated to result in a counterbalancing reaction force upon the respective actuator arms 36a, 36c associated with the actuation of the force-balancing microactuators 72a-b, which can reduce undesirable vibrations. Unlike the hinge plates 62a-d, the hinge plates 62e-f might not include an out of plane form or bend for slider pre-load purposes.

It is contemplated that the head gimbal assemblies 38a, 38d each has a mass. In the embodiment of FIG. 6, the balancing elements may each have a mass between eighty (80%) and one hundred and twenty percent (120%) of such mass of the gimbal assemblies 38a, 38d. In this regard, a substantial amount of the mass of each of the head gimbal assemblies 38a, 38b are related to the respective masses of the hinge plates 62a, 62d and the load beams 64a, 64f. In the embodiment shown, the hinge plates 62e-f and load beams 64e-f are respectively similar to the hinge plates 62a, 62d and the load beams 64a, 64f. It is understood that such balancing elements need not be similar to components attached to the microactuators 70a, 70d in this manner and that such balancing element may be of a variety of sizes and geometries. However, where the similar components are used, it is contemplated that existing installation and handling processes that are used to attach the hinge plates 62a, 62d and the load beams 64a, 64f to the microactuators 70a, 70d may be utilized to attach the hinge plates 62e-f and the load beams 64e-f to the force-balancing microactuators 72a-b.

However, in an embodiment where the disk drive 10 includes one or more microactuators that are designed to move only the head 42 relative to the load beam 64, rather than the load beam 64 relative to the swage mounting plate 74, the mass of any balancing element may be less than ten (10%) of the mass of the head gimbal assembly 38.

Figure 9:
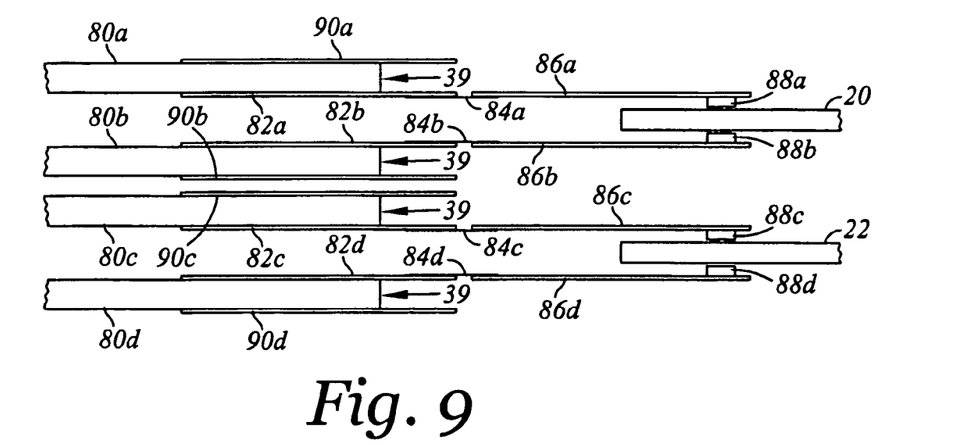
FIG. 9 is a side view of a portion of an actuator assembly according to another exemplary embodiment of the present invention.

Referring now to FIG. 9, there is depicted another embodiment. Similar reference numerals as those in relation to the embodiments shown in FIGS. 1-5 are used to indicate similarly configured components, however, with those differences as noted below. In this regard, FIG. 9 depicts a side view similar to the portion of the actuator assembly 28. However, in this embodiment, there are provided four actuator arms 80a-d to service the two disks 20, 22. The actuator arms 80b-c are positioned horizontally disposed between the disks 20, 22. Each of the actuator arms 80a-d includes respective ones of the microactuators 82a-d, hinge plates 84a-d, load beams 86a-d, and heads 88a-d. Thus, in this embodiment, each of the actuator arms 80a-d has a single one of the heads 88a-d. In addition, the actuator arms 80a-d respectively include force-balancing microactuators 90a-d. The force-balancing microactuators 90a-d may be configured to be actuated in a direction opposite the microactuators 82a-d.

We claim:

1. An actuator assembly for use in a disk drive, the actuator assembly comprising:
 a first read head;
 a coarse actuator including:
  a coarse actuator body; and
  a first actuator arm extending away from the coarse actuator body, the first actuator arm having a proximal end attached to the coarse actuator body and a distal end;
 a first microactuator attached to the distal end of the first actuator arm, the first microactuator supporting the first read head; and
 a first force-balancing microactuator attached to the distal end of the first actuator arm without any read head attached to the first force-balancing microactuator.

2. The actuator assembly of claim 1 further comprising a first balancing element supported by the first force-balancing microactuator.

3. The actuator assembly of claim 2 further comprising a first head gimbal assembly that includes the first read head, the first head gimbal assembly having a first mass, the first balancing element having a mass between eighty percent and one hundred and twenty percent of the first mass.

4. The actuator assembly of claim 1 further comprising a second actuator arm, a second read head, and a second microactuator distally attached to the second actuator arm, the second microactuator supporting the second read head.

5. The actuator assembly of claim 4 further comprising a third read head, and a third microactuator distally attached to the second actuator arm, the third microactuator supporting the third read head.

6. The actuator assembly of claim 5 further comprising a third actuator arm, a fourth read head, and a fourth microactuator distally attached to the third actuator arm, the second actuator arm being disposed between the first actuator arm and the third actuator arm, the fourth microactuator supporting the fourth read head.

7. The actuator assembly of claim 6 further comprising a second force-balancing microactuator distally attached to the third actuator arm without any read head attached to the second force-balancing microactuator.

8. The actuator assembly of claim 4 further comprising a second force-balancing microactuator distally attached to the second actuator arm without any read head attached to the second force-balancing microactuator.

9. The actuator assembly of claim 8 further comprising
 a first balancing element supported by the first force-balancing microactuator;
 a first head gimbal assembly that includes the first read head, the first head gimbal assembly having a first mass, the first balancing element having a mass between eighty percent and one hundred and twenty percent of the first mass;
 a second balancing element supported by the second force-balancing microactuator; and
 a second head gimbal assembly that includes the second read head, the second head gimbal assembly having a second mass, the second balancing element having a mass between eighty percent and one hundred and twenty percent of the second mass.

10. The actuator assembly of claim 1 wherein the first force-balancing microactuator is configured to actuate in a direction opposite of the first microactuator during operation of the first micro actuator.

* * * * *